(12) United States Patent
Chou

(10) Patent No.: US 8,365,362 B2
(45) Date of Patent: Feb. 5, 2013

(54) SAFETY RELEASE DEVICE FOR ROMAN BLIND PULL CORD

(76) Inventor: Tser Wen Chou, Taipei (TW)

(*) Notice: Subject to any disclaimer, the term of this patent is extended or adjusted under 35 U.S.C. 154(b) by 209 days.

(21) Appl. No.: 12/982,042

(22) Filed: Dec. 30, 2010

(65) Prior Publication Data

US 2012/0167350 A1    Jul. 5, 2012

(51) Int. Cl.
*E06B 9/326* (2006.01)
*F16G 11/10* (2006.01)

(52) U.S. Cl. ............ 24/115 F; 24/115 R; 24/131 C; 24/136 L; 160/178.1 R; 160/178.2

(58) Field of Classification Search ............ 24/115 F, 24/115 R, 131 C, 136 L; 160/178.1 R, 178.2
See application file for complete search history.

(56) References Cited

U.S. PATENT DOCUMENTS

| | | | |
|---|---|---|---|
| 705,992 A * | 7/1902 | Ansley | 16/216 |
| 1,465,759 A * | 8/1923 | Dey | 16/442 |
| 3,269,453 A * | 8/1966 | Vecchiarelli et al. | 160/176.1 R |
| 4,782,560 A * | 11/1988 | Keller | 24/136 L |
| D395,973 S * | 7/1998 | Huang | D6/581 |
| 5,823,242 A * | 10/1998 | Huang | 160/178.1 R |
| 5,919,542 A * | 7/1999 | Chou | 428/99 |
| 5,987,709 A * | 11/1999 | Chou | 24/116 A |
| 6,591,461 B2 * | 7/2003 | Salentine et al. | 24/115 F |
| 6,604,882 B2 * | 8/2003 | Gordon et al. | 403/2 |
| 7,325,279 B2 * | 2/2008 | Huang et al. | 24/115 F |
| 2005/0115685 A1 * | 6/2005 | Nien | 160/166.1 |
| 2007/0023149 A1 * | 2/2007 | Lamars et al. | 160/84.01 |
| 2008/0066876 A1 * | 3/2008 | Ganzi | 160/168.1 R |

* cited by examiner

*Primary Examiner* — Robert J Sandy
*Assistant Examiner* — David Upchurch
(74) *Attorney, Agent, or Firm* — Ming Chow; Sinorica, LLC

(57) ABSTRACT

A safety release device for Roman blind pull cord is disposed between the control pull cord of the Roman blind and a lower suspension thereof. The safety release device includes a latch body for connecting with the pull cord, a latch ring seat connected with the lower suspension of the Roman blind, and a connection barrel. The latch body can be plugged into and latched with the connection barrel or extracted out of the connection barrel. The latch body has a latch force greater than the weight of the suspended Roman blind. When an abnormal pulling force greater than the latch force between the latch body and the connection barrel is applied to the pull cord in any direction, the latch body will be easily extracted out of the connection barrel to avoid tangle of the pull cord with a kid and ensure safety in use of the Roman blind.

17 Claims, 22 Drawing Sheets

SAFETY RELEASE DEVICE FOR ROMAN BLIND PULL CORD

BACKGROUND OF THE INVENTION

1. Field of the Invention

The present invention relates generally to a safety release device for Roman blind pull cord. In case of tangle of the pull cord with a kid, the pull cord can be easily loosened by means of the safety release device so as to avoid danger in use of the Roman blind.

2. Description of the Related Art

A conventional Roman blind is folded or unfolded and suspended by means of a control pull cord. No matter whether the Roman blind is folded or suspended, the pull cord is often suspended to the ground or to a certain height. In case a kid plays around the Roman blind and incautiously tangles with the pull cord, the kid is in the danger of strangulation. Therefore, in use of the Roman blind, the suspended pull cord may lead to fatal danger.

SUMMARY OF THE INVENTION

It is therefore a primary object of the present invention to provide a safety release device for Roman blind pull cord. The safety release device includes a latch body and a connection barrel connected between the latch body and the lower suspension of the Roman blind. The pull cord is connected with the latch body instead of being directly tied to the lower suspension of the Roman blind. In case of tangle of the pull cord with a kid, the latch body can be easily extracted out of the connection barrel to loosen the pull cord and thus avoid danger of strangulation of the kid.

To achieve the above and other objects, the safety release device for Roman blind pull cord of the present invention includes:

a latch body having a cord retainer body and a ball latch body downward extending from a lower side of the cord retainer body, the cord retainer body being a hollow body, an upper end of the cord retainer body being formed with a perforation for the pull cord to extend through the perforation and connect with the cord retainer body, whereby the pull cord is hidden in the cord retainer body;

a connection barrel, which is a hollow body having an interior spherical socket, an upper end of the connection barrel being formed with a circular through hole in communication with the spherical socket, two opposite sides of the connection barrel being respectively formed with at least two elliptic escape holes in communication with the spherical socket, a split being formed on an upper side of each elliptic escape hole, the split extending from the elliptic escape hole to the upper end face of the connection barrel, whereby the ball latch body of the latch body can be correspondingly plugged into the spherical socket of the connection barrel or extracted out of the spherical socket; and a double latch ring seat, which can be latched with the connection barrel and connected with the lower suspension of the Roman blind, the double latch ring seat including a disc-shaped main body, a pair of latch arms disposed on the disc-shaped main body in parallel to each other, and a latch ring body downward extending from a lower end of the disc-shaped main body, the latch ring body being connected with the lower suspension of the Roman blind via a movable ring.

Alternatively, the safety release device for Roman blind pull cord of the present invention includes:

a latch body including a latch head and a ball latch body integrally extending from a lower end of the latch head, an upper end of the latch head being formed with a perforation, one sidewall of the latch head being formed with a hole, the ball latch body being connected with the lower end of the latch head via a connection stem, whereby the ball latch body is spaced from the latch head by a certain distance;

a connection barrel, which is a hollow body having an interior spherical socket, an upper end of the connection barrel being formed with a circular through hole in communication with the spherical socket, two opposite sides of the connection barrel being respectively formed with at least two elliptic escape holes in communication with the spherical socket, a split being formed on an upper side of each elliptic escape hole, the split extending from the elliptic escape hole to the upper end face of the connection barrel, whereby the ball latch body of the latch body can be correspondingly plugged into the spherical socket of the connection barrel or extracted out of the spherical socket; and a double latch ring seat, which can be latched with the connection barrel and connected with the lower suspension of the Roman blind, the double latch ring seat including a disc-shaped main body, a pair of latch arms disposed on the disc-shaped main body in parallel to each other, and a latch ring body downward extending from a lower end of the disc-shaped main body, the latch ring body being connected with the lower suspension of the Roman blind via a movable ring.

The present invention can be best understood through the following description and accompanying drawings, wherein:

DETAILED DESCRIPTION OF THE PREFERRED EMBODIMENTS

Figure 1:
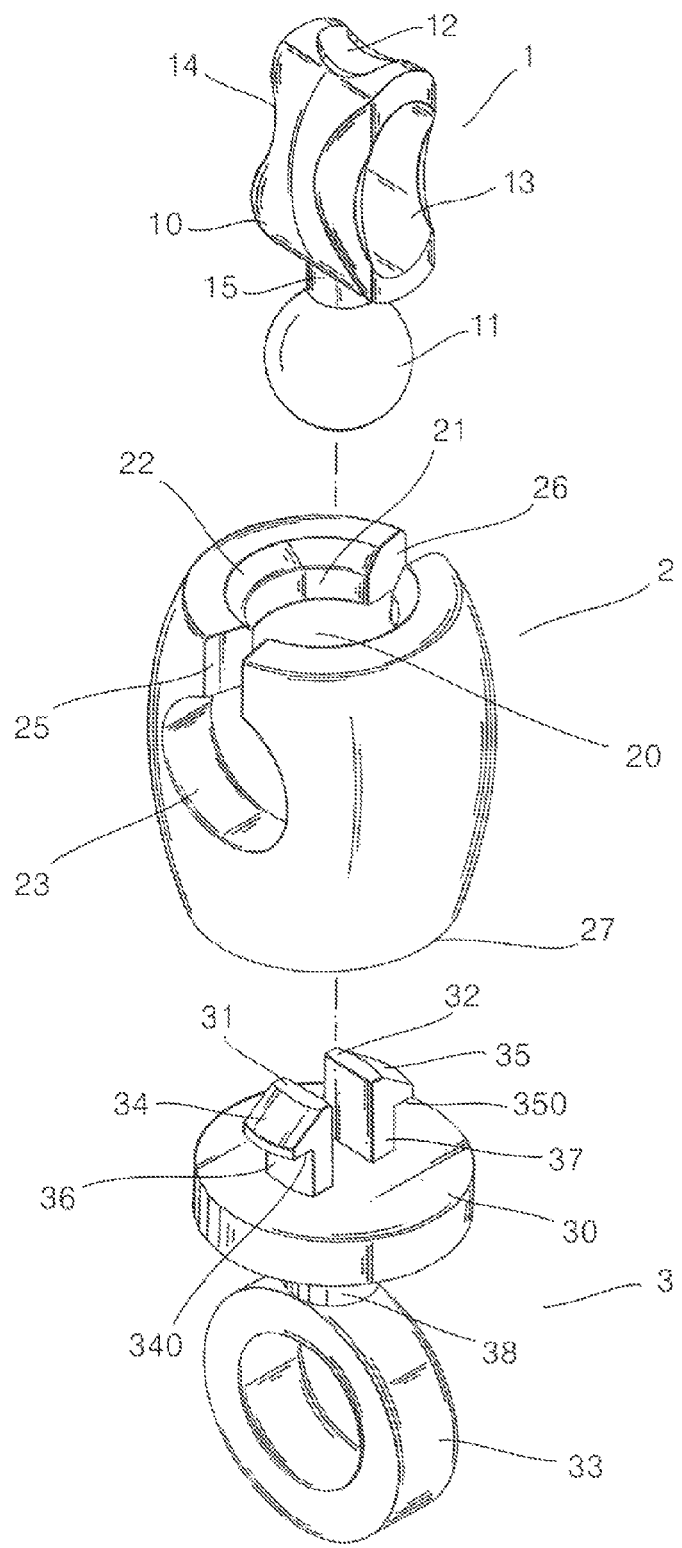
FIG. 1 is a perspective exploded view of a preferred embodiment of the present invention.
Figure 2:
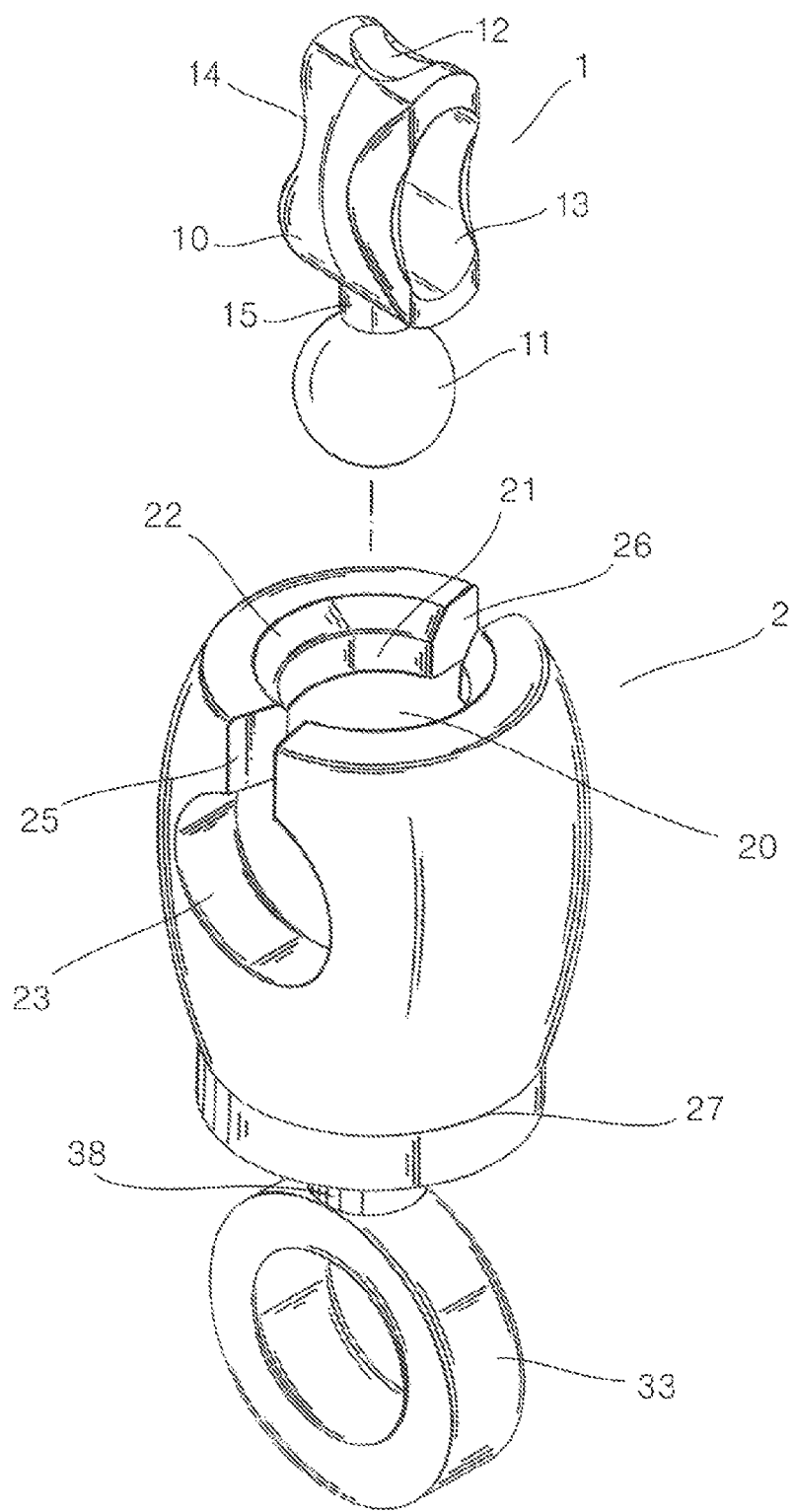
FIG. 2 is a perspective partially exploded view of the preferred embodiment of the present invention.
Figure 3:
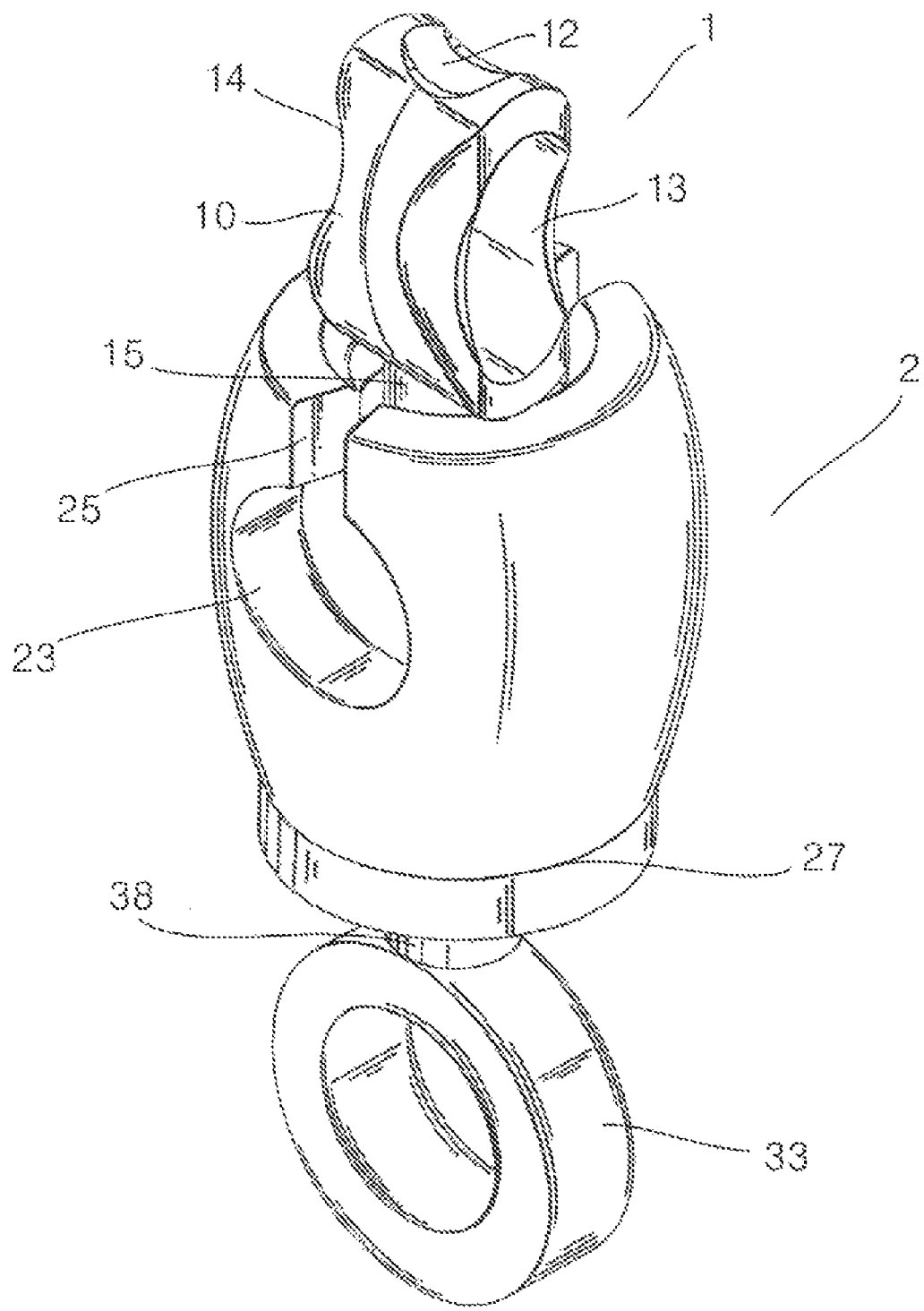
FIG. 3 is a perspective assembled view of the preferred embodiment of the present invention.

Please refer to FIGS. 1, 2 and 3. The present invention includes a latch body 1, a connection barrel 2 and a double latch ring seat 3. The latch body 1 has a cord retainer body 10 for connecting with a pull cord and a ball latch body 11 downward extending from the cord retainer body 10. The cord retainer body 10 is a hollow body. An upper end of the cord retainer body 10 is formed with a perforation 12 for the pull cord to extend into the cord retainer body 10. The perforation 12 is inward tapered in the form of a funnel. In addition, two sides of the cord retainer body 10 are respectively formed with two through holes 13, 14 in communication with an interior space of the cord retainer body 10. The ball latch body 11 is integrally connected with a lower end of the cord retainer body 10 via a connection stem 15. The ball latch body 11 can be latched with the connection barrel 2.

Figure 6:
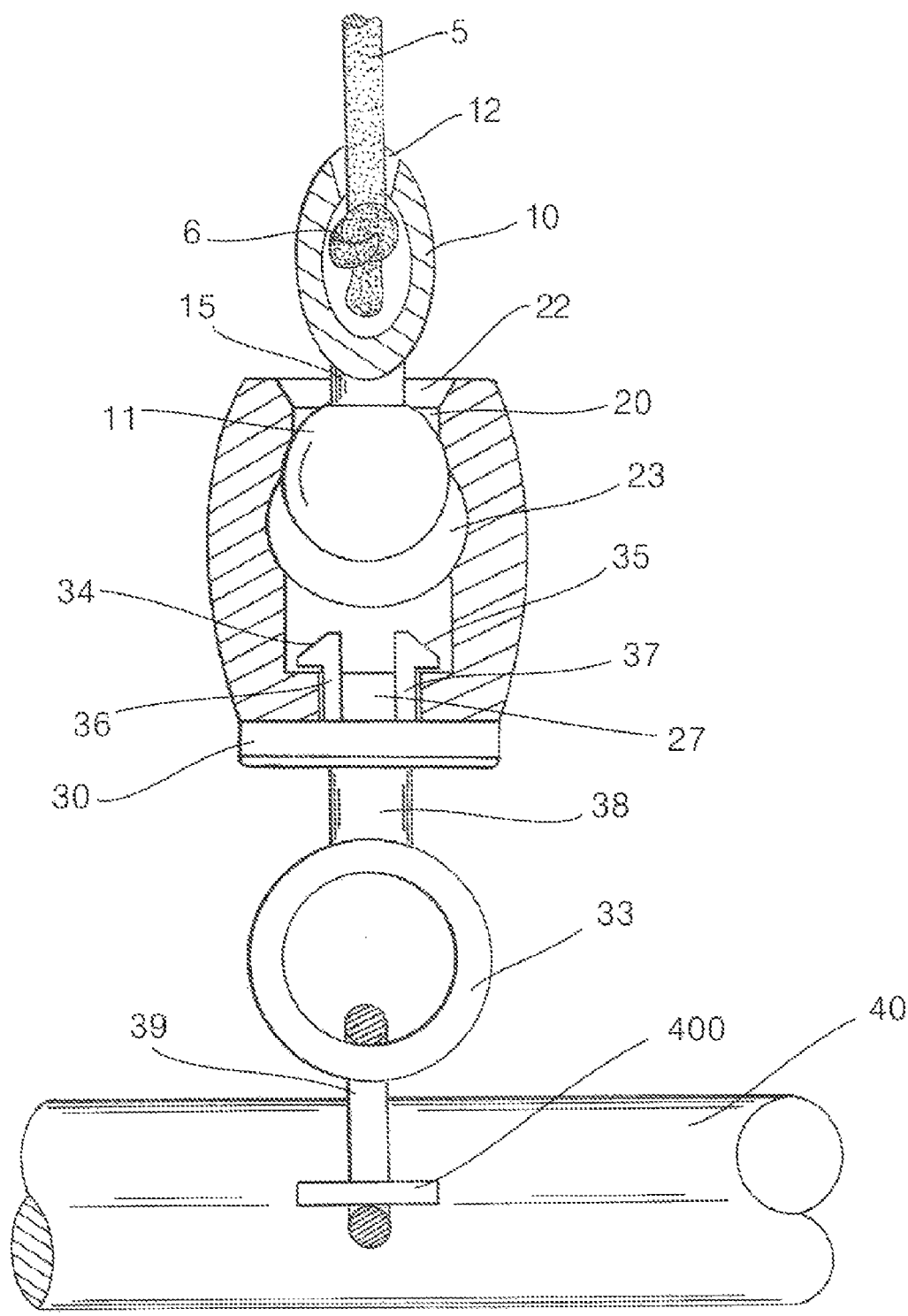
FIG. 6 is a sectional assembled view of the preferred embodiment of the present invention.

The connection barrel 2 is a hollow body having an interior space extending through the connection barrel 2 from upper end to lower end. The connection barrel 2 is formed with an interior spherical socket 20 (as shown in FIG. 6). The connection barrel 2 has the form of a barrel body. The upper end of the connection barrel 2 is formed with a circular through hole 21 in communication with the spherical socket 20. The circumference of the opening of the circular through hole 21 is formed with a beveled face 22 to define a tapered hole. The beveled face 22 makes it easy to directly and smoothly plug the ball latch body 11 into the spherical socket 20. Two opposite sides of the connection barrel 2 are respectively formed with a pair of elliptic escape holes 23 in communication with the spherical socket 20. (One of the escape holes 23 is not shown). Two splits 25, 26 are respectively formed on upper sides of the elliptic escape holes 23, whereby the connection barrel 2 has a resilient left wall and a resilient right wall. The splits 25, 26 are tapered, whereby the connection stem 15 connected to the upper end of the ball latch body 11 can easily pass through the splits 25, 26. Accordingly, the latch body 1 can be latched with or separated from the connection barrel 2. A bottom end of the connection barrel 2 is formed with a through hole 27 in communication with the interior space of the connection barrel 2 (as shown in FIG. 6). The double latch ring seat 3 can be upward plugged through the through hole 27 and latched with the connection barrel 2.

The double latch ring seat 3 includes a disc-shaped main body 30, a pair of latch arms 31, 32 upward projecting from the disc-shaped main body 30, and a latch ring body 33 integrally downward extending from the bottom of the disc-shaped main body 30. The two latch arms 31, 32 are oppositely arranged on two sides of the disc-shaped main body 30 in parallel to each other. Each latch arm 31, 32 has a straight shank section 36, 37 upward extending from the disc-shaped main body 30 and a hook section 34, 35 at the free end of the shank section 36, 37. Each hook section 34, 35 has a lower plane face 340, 350. When the latch arms 31, 32 are directly plugged through the through hole 27 of the connection barrel 2, the plane faces 340, 350 of the hook sections 34, 35 are latched with the bottom of the connection barrel 2 to affix the double latch ring seat 3 to the connection barrel 2 without detachment. The latch ring body 33 is integrally connected with the disc-shaped main body 30 via a connection stem 38. The latch ring body 33 is further linked with a movable ring 39 for fixedly connecting with a fixing ring 400 of the lower suspension 40 (as shown in FIGS. 4 and 5).

The above components are assembled to form the safety release device of the present invention as shown in FIG. 3. The safety release device is disposed between the pull cord 5 of the Roman blind 4 and the lower suspension 40 of the Roman blind 4 for connecting the pull cord 5 with the Roman blind 4 in a quick release manner (as shown in FIG. 4).

Figure 4:
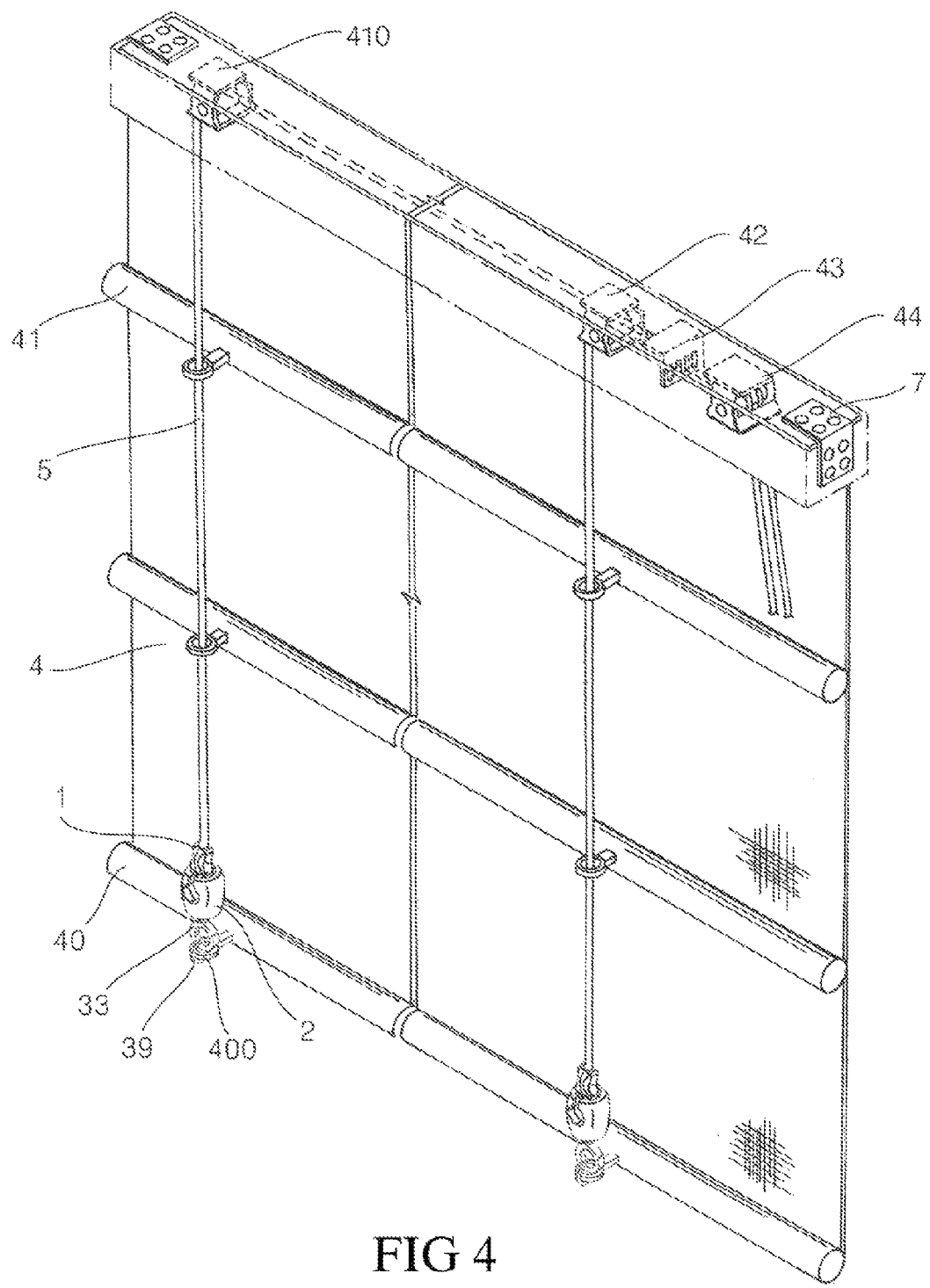
FIG. 4 is a perspective view showing the installation of the present invention.
Figure 5:
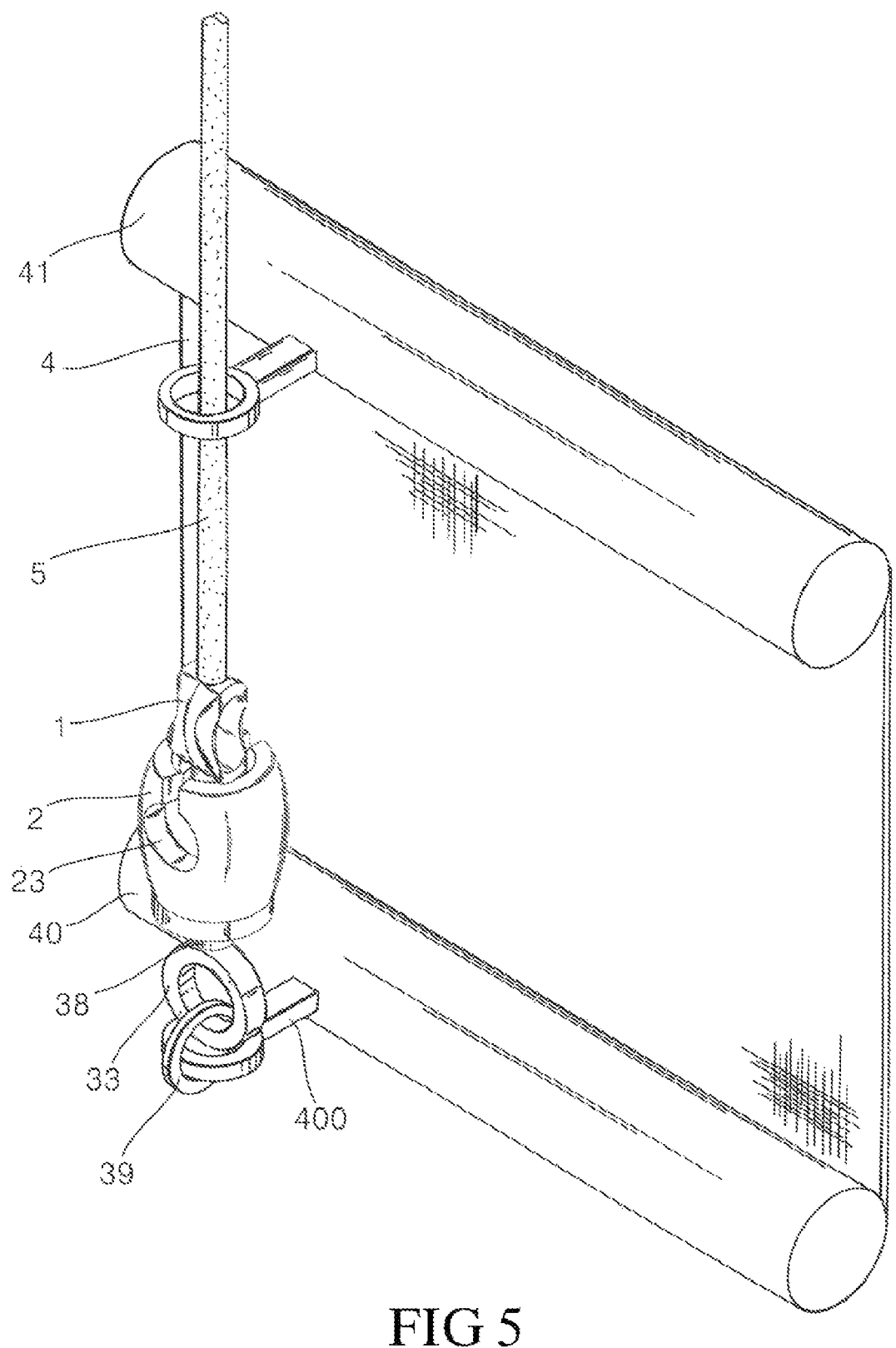
FIG. 5 is an enlarged view of a part of FIG. 4.

Referring to FIGS. 4, 5 and 6, the latch ring body 33 of the double latch ring seat 3 is linked to the fixing ring 400 of the lower suspension 40 via the ring 39. The pull cord 5 is passed through the perforation 12 of the cord retainer body 10. Then, the pull cord 5 is pulled out of the through hole 13 or 14 and knotted to form a knot 6 with a larger diameter. In this case, the knot 6 is hidden in the cord retainer body 10 and prevented from being extracted out of the perforation 12 so that the pull cord 5 is connected with the cord retainer body 10. The pull cord 5 is further passed through the fixing rings 400 projecting from the respective beams 41 of the Roman blind 4 (as shown in FIGS. 4 and 5). The pull cord 5 is further passed through two roller seats 410, 42 and a locating seat 43 and collected in a frame seat 7. By means of a pull cord control seat 44, the pull cord 5 is controlled and operated to drive the blind face to ascend or descend. The pull cord 5 is naturally suspended to the ground to facilitate pulling operation.

The safety release device of the present invention has a latch force slightly greater than the weight of the suspended Roman blind. Therefore, when the Roman blind is normally suspended, by means of two safety release devices symmetrically connected with the pull cords on two sides of the Roman blind and the internal components of the frame seat 7, the Roman blind 4 can be operated and pulled up or dropped down. Accordingly, the Roman blind 4 can be normally operated to provide sunshade effect.

Figure 7:
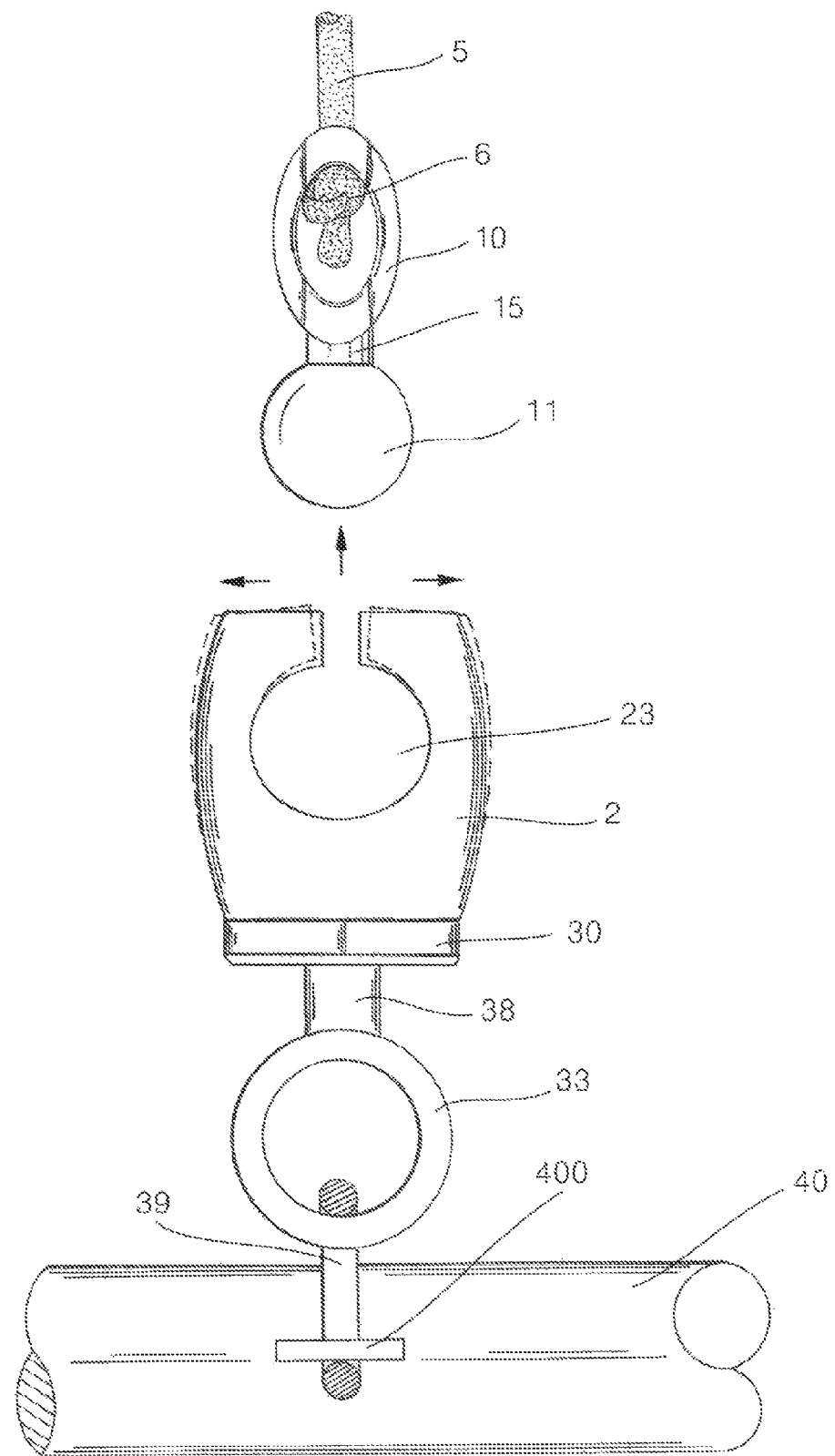
FIG. 7 is a view showing that the ball latch body is extracted out of the connection barrel.
Figure 8:
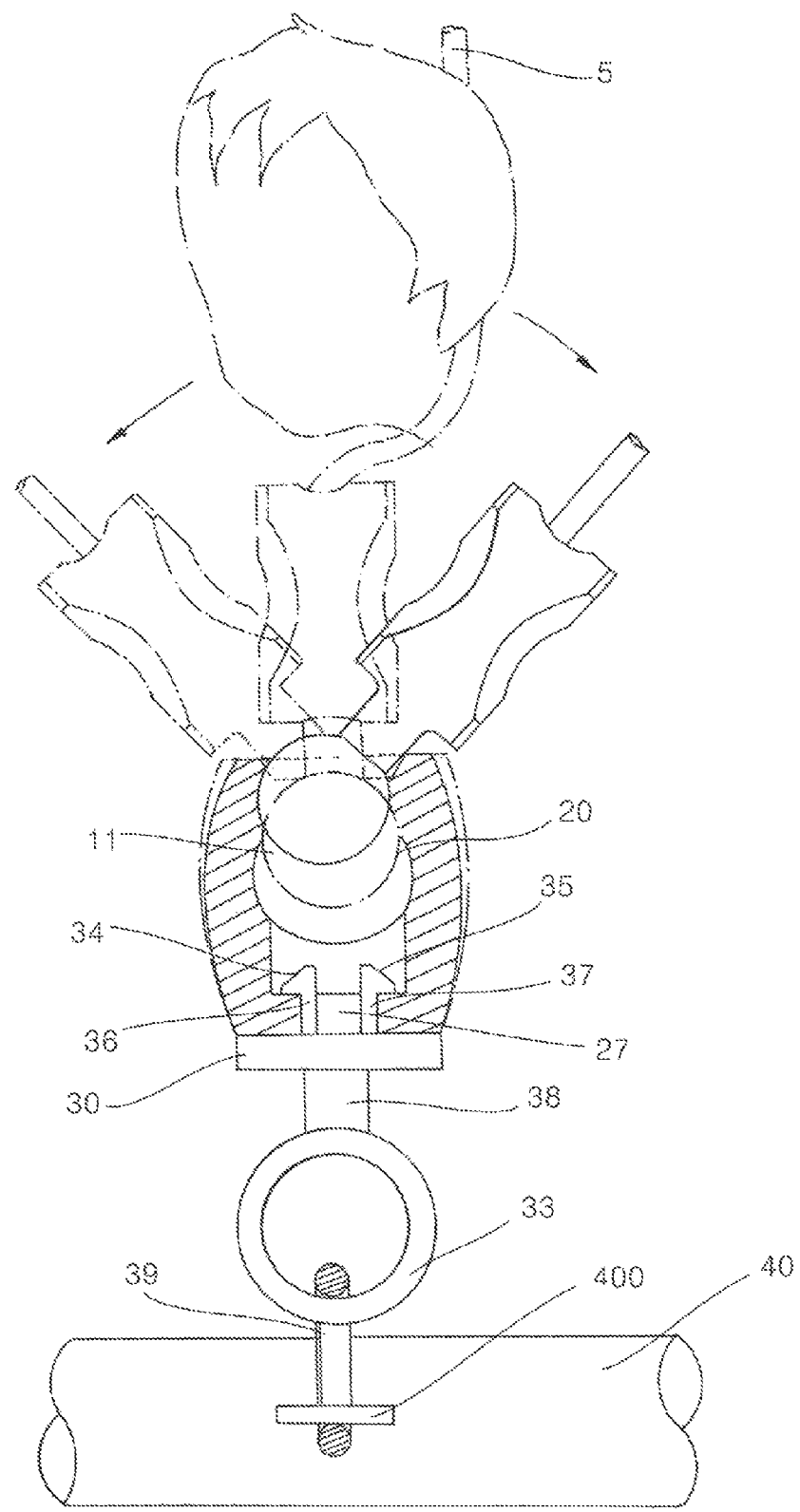
FIG. 8 is a view showing that the ball latch body is extracted out of the connection barrel in case of tangle of the pull cord with a kid.
Figure 9:
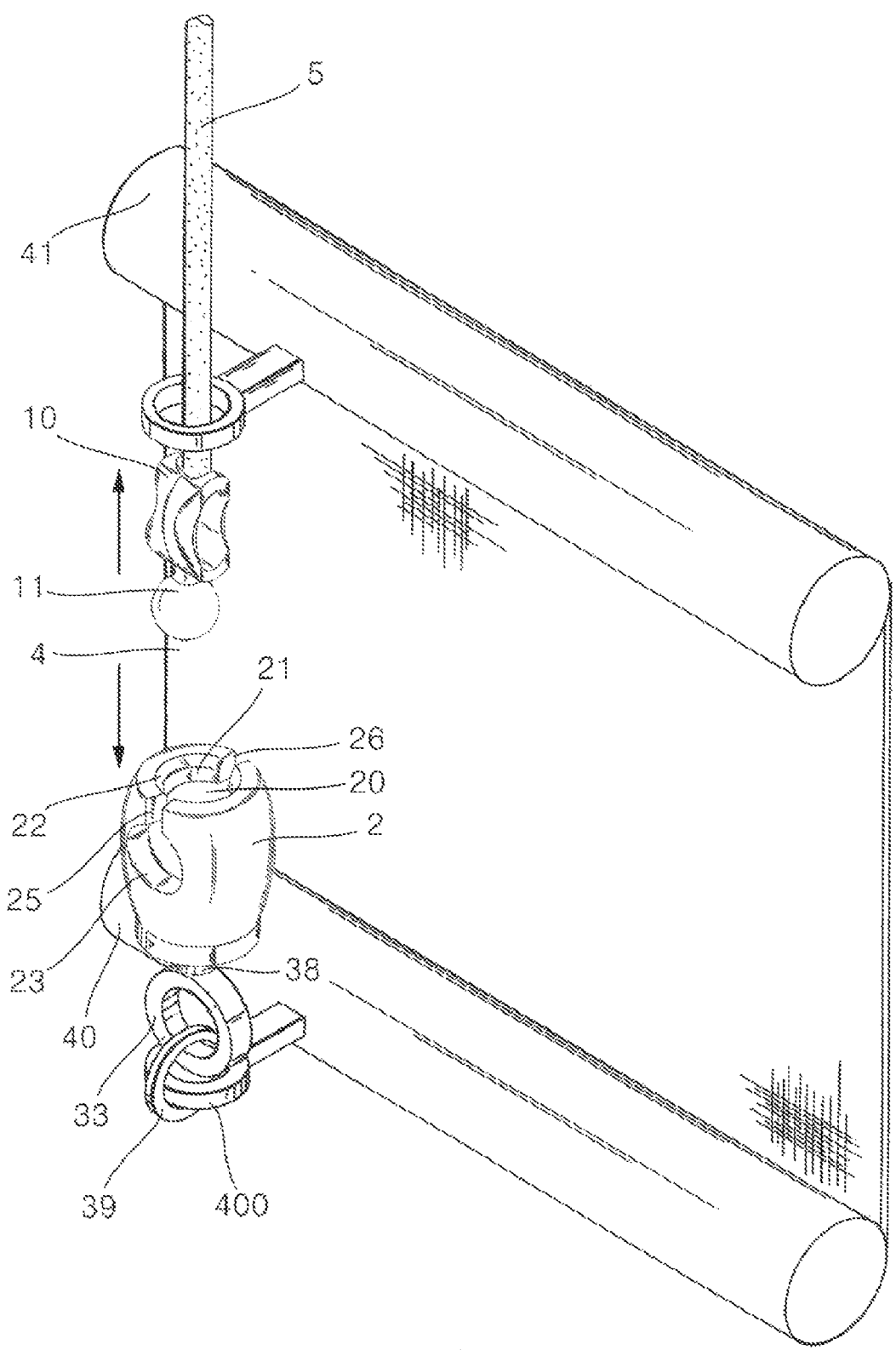
FIG. 9 is a view showing the extraction path of the ball latch body of the present invention.
Figure 10:
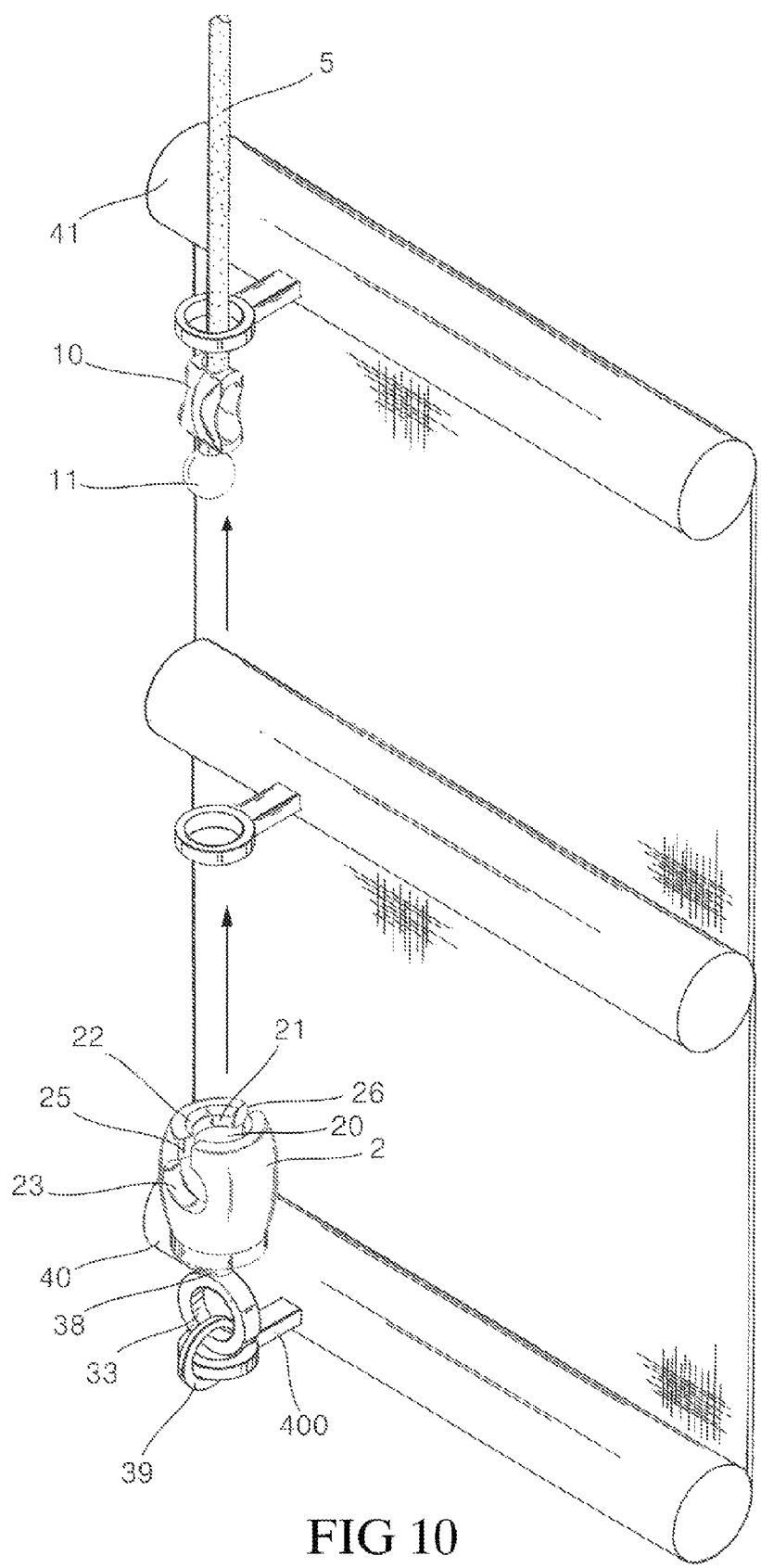
FIG. 10 is a view showing that the latch body is completely separated from the connection barrel of the present invention.

Referring to FIGS. 7 and 8, in case a kid plays the pull cord 5 of the Roman blind 4 and the kid's neck is incautiously tangled with the pull cord 5, since the kid's weight is greater than the weight of the suspended Roman blind and greater than the latch force of the safety release device, the ball latch body 11 of the latch body 1 will be extracted out of the connection barrel 2 by unexpected pulling force (as shown in FIG. 7). At this time, the resilient left and right walls of the connection barrel 2 are biased laterally to enlarge the diameter of the spherical socket 20. Therefore, when the diameter of the spherical socket 20 becomes larger than that of the ball latch body 1, the ball latch body 11 will automatically separate from the spherical socket 20 of the connection barrel 2 and disconnect from the connection barrel 2. Under such circumstance, the pull cord 5 and the cord retainer body 10 are upward moved out of the fixing rings 400 and released from the fastening force. Accordingly, the kid's neck can be released from the tangle of the pull cord 5 to ensure safety in use (as shown in FIGS. 9 and 10).

Figure 11:
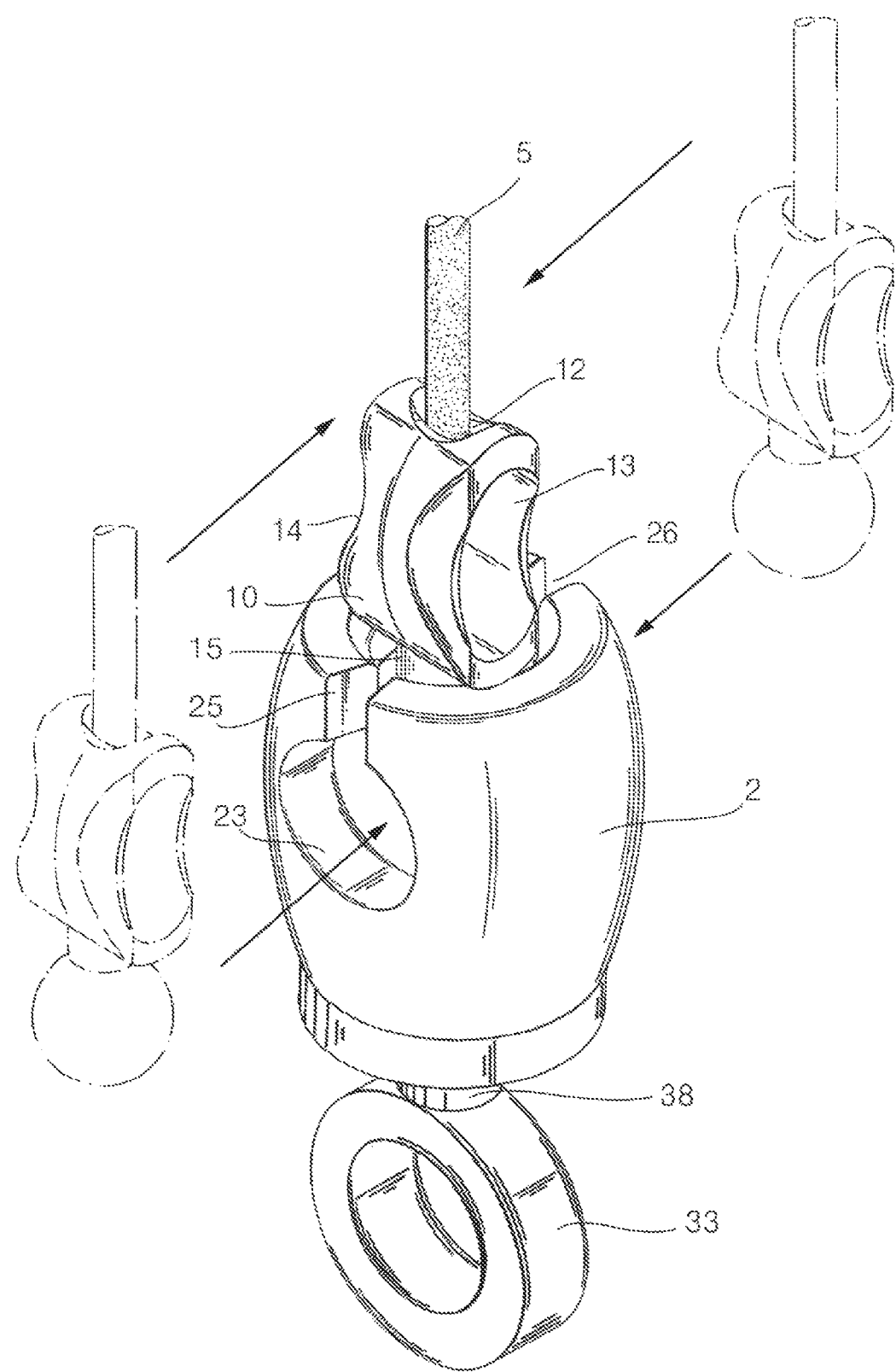
FIG. 11 is a perspective view showing the assembling process of the latch body with the connection barrel of the present invention.

It should be noted that in case the direction of the unexpected pulling force is not perpendicular to the cord retainer body 11, the ball latch body 11 can be still easily extracted out of the connection barrel 2 due to its spherical surface. In case of excessively large angle, the ball latch body 11 can be extracted out of the connection barrel 2 through any of the elliptic escape holes 23 formed on two sides of the connection barrel 2. This also provides a universal security effect to avoid the danger of strangulation of the kid. When it is desired to reconnect the latch body 1 with the connection barrel 2, a user only needs to plug the ball latch body 11 into the spherical socket 20 of the connection barrel 2 through any of the elliptic escape holes 23 formed on two sides of the connection barrel 2 (as shown in FIG. 11). Therefore, the latch body 1 can be quickly reconnected with the connection barrel 2.

Figure 12:
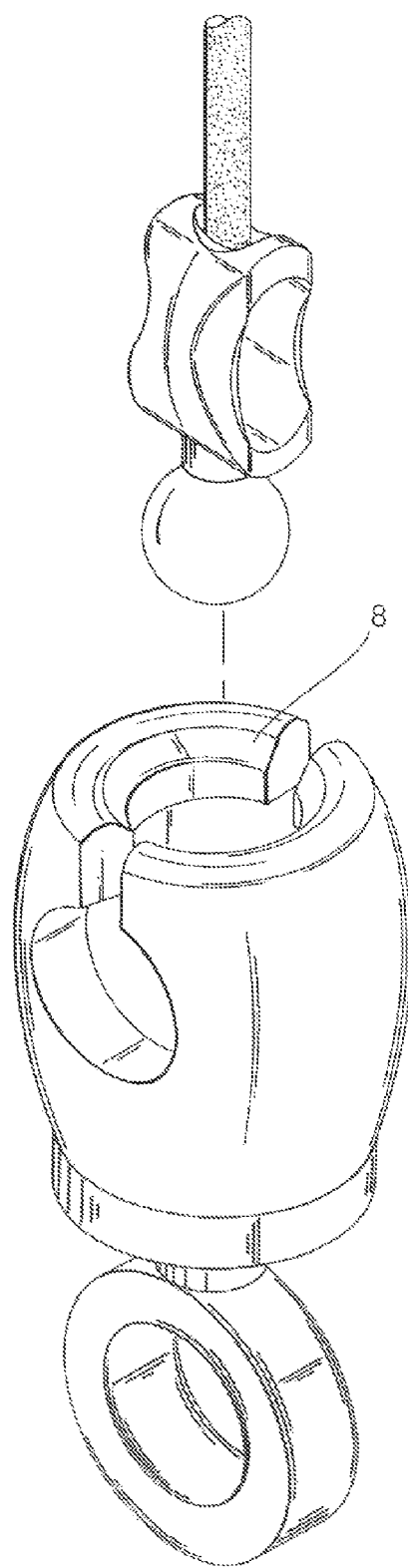
FIG. 12 is a perspective view of another embodiment of the connection barrel of the present invention.
Figure 13:
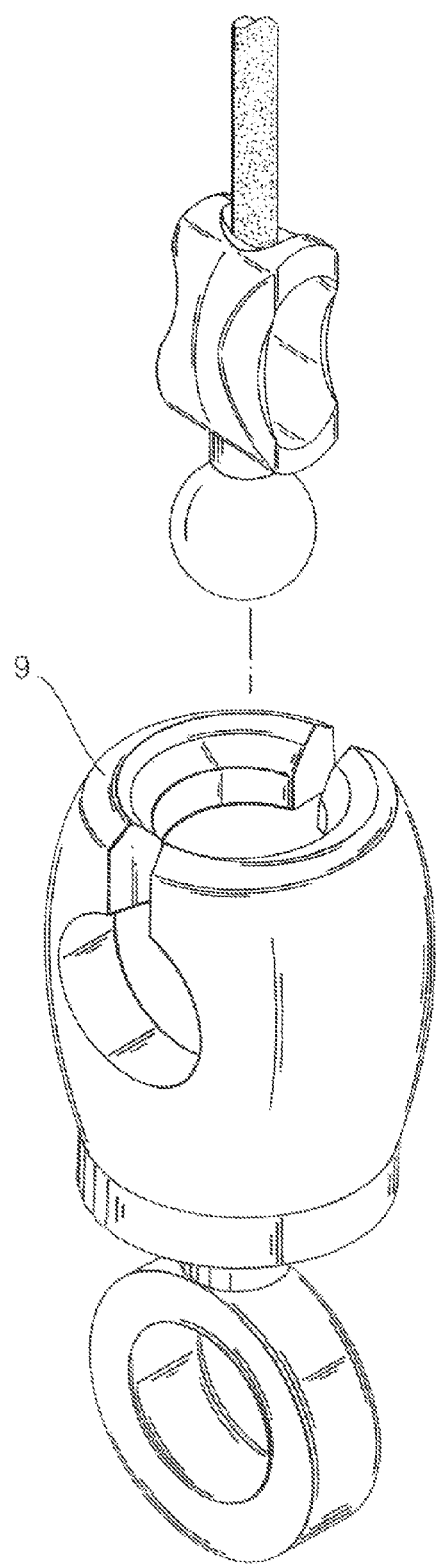
FIG. 13 is a perspective view of still another embodiment of the connection barrel of the present invention.

Please now refer to FIGS. 12 and 13, which show two other embodiments of the present invention. These two embodiments are respectively different from the first embodiment in that the upper end face of the connection barrel 2 is formed with an arcuate face 8 (FIG. 12) or an angle structure 9 with two beveled faces (FIG. 13). This enables the ball latch body 11 to more precisely and more smoothly plug into the connection barrel 2.

Figure 14:
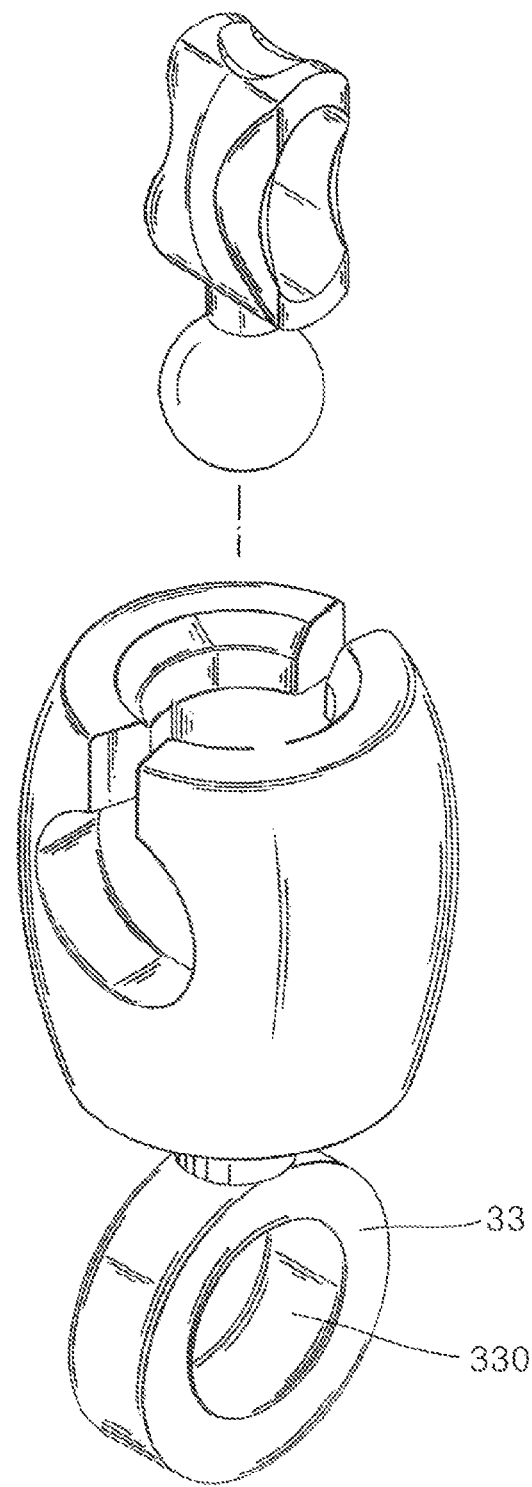
FIG. 14 is a perspective view of another embodiment of the present invention.

FIG. 14 shows another embodiment of the present invention, in which the ring section 33 directly integrally extends from the bottom of the connection barrel 2. The central through hole 330 of the ring section 33 is directed in a direction different from that of the elliptic escape holes 23 formed on two sides of the connection barrel 2. This facilitates linkage of the ring 39 with the ring section 33.

Figure 15:
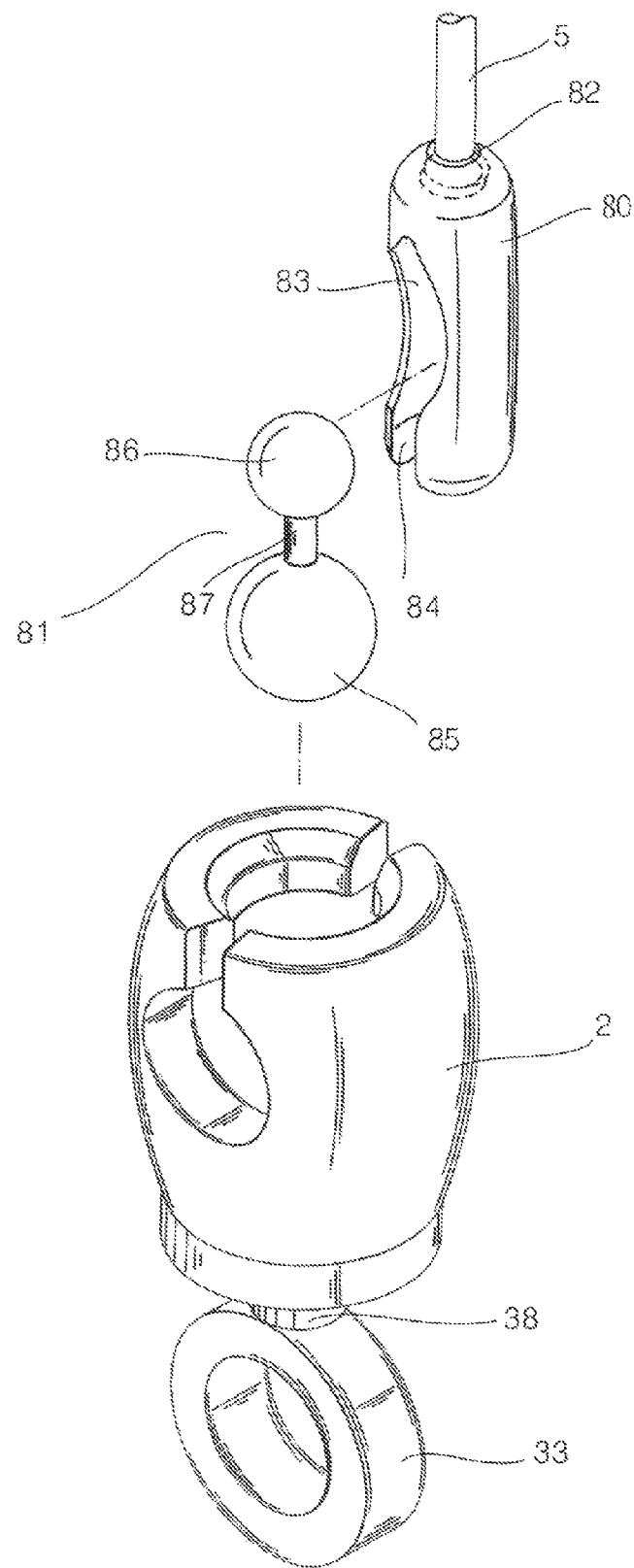
FIG. 15 is a perspective view of another embodiment of the latch body of the present invention.

FIG. 15 shows another embodiment of the present invention, in which the latch body 1 includes a connector 80 and a connection rod 81 with double ball bodies. An upper end of the connector 80 is formed with a perforation 82 for the pull cord 5 to extend through and connect with the connector 80. One sidewall of the connector 80 is formed with a slot 83. A lower end of the connector 80 is formed with a fissure 84 in communication with the slot 83. The connection rod 81 has two ball bodies 85, 86 with different diameters and a connection stem 87 interconnected between the two ball bodies 85, 86. The small-diameter ball body 85 is directly plugged into the slot 83 of the connector 80. The connection stem 87 can just pass through the fissure 84. The large-diameter ball body 85 is connected with lower end of the connection stem 87 and positioned outside the connector 80. The ball body 85 can be plugged into and connected with the connection barrel 2.

Figure 16:
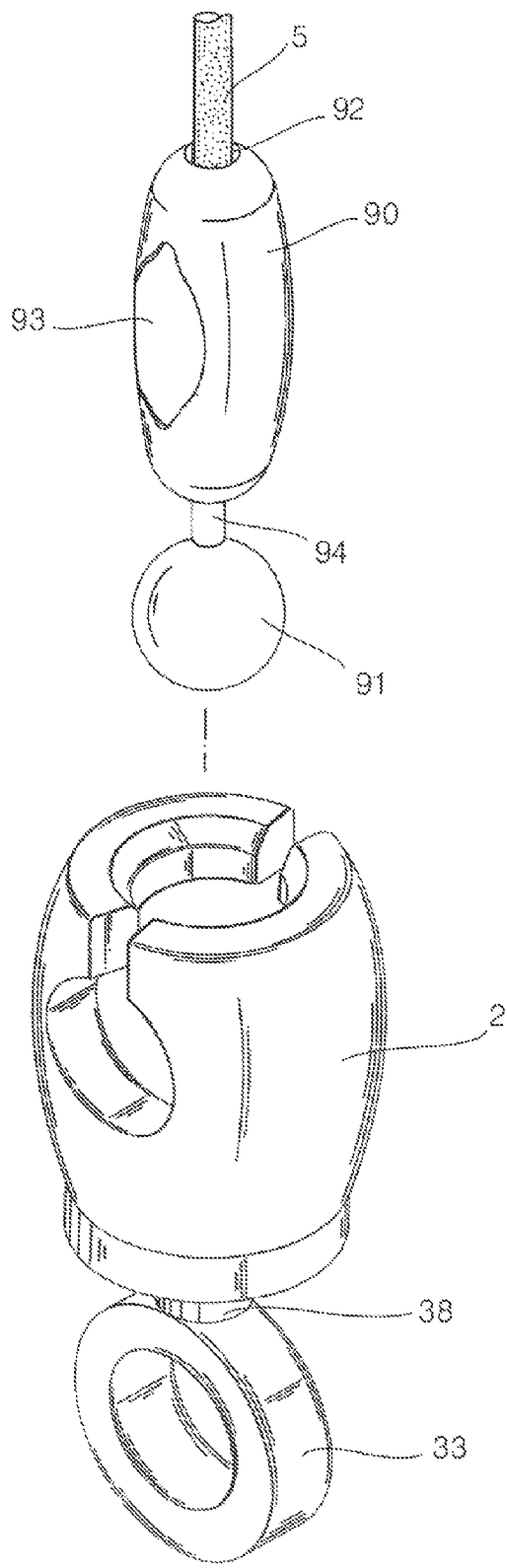
FIG. 16 is a perspective view of still another embodiment of the latch body of the present invention.

FIG. 16 shows another embodiment of the present invention, in which the latch body 1 includes a latch head 90 and a ball latch body 91 integrally extending from a lower end of the latch head 90. An upper end of the latch head 90 is formed with a perforation 92 for the pull cord 5 to extend through and connect with the latch head 90. One sidewall of the latch head 90 is formed with a hole 93. The ball latch body 91 is connected with the lower end of the latch head 90 via a connection stem 94. The ball latch body 91 is spaced from the latch head 90 by a certain distance. The end of the pull cord 5 is passed through the perforation 92 and pulled out of the hole 93 and knotted to connect the pull cord 5 with the latch head 90. The ball latch body 91 at the lower end of the latch head 90 can be directly plugged into and connected with the connection barrel 2.

Figure 17:
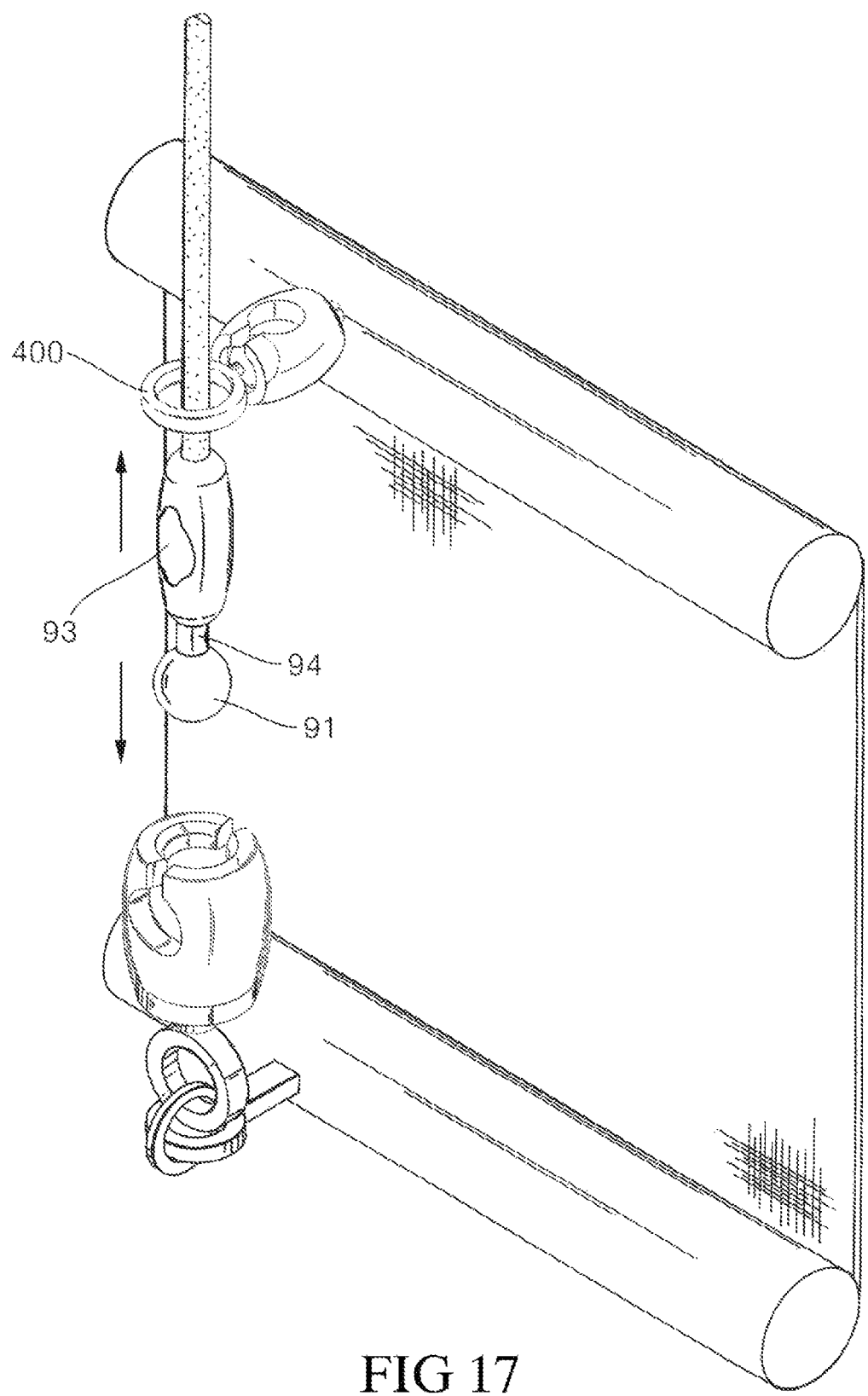
FIG. 17 is a perspective view showing the use of the present invention.
Figure 18:
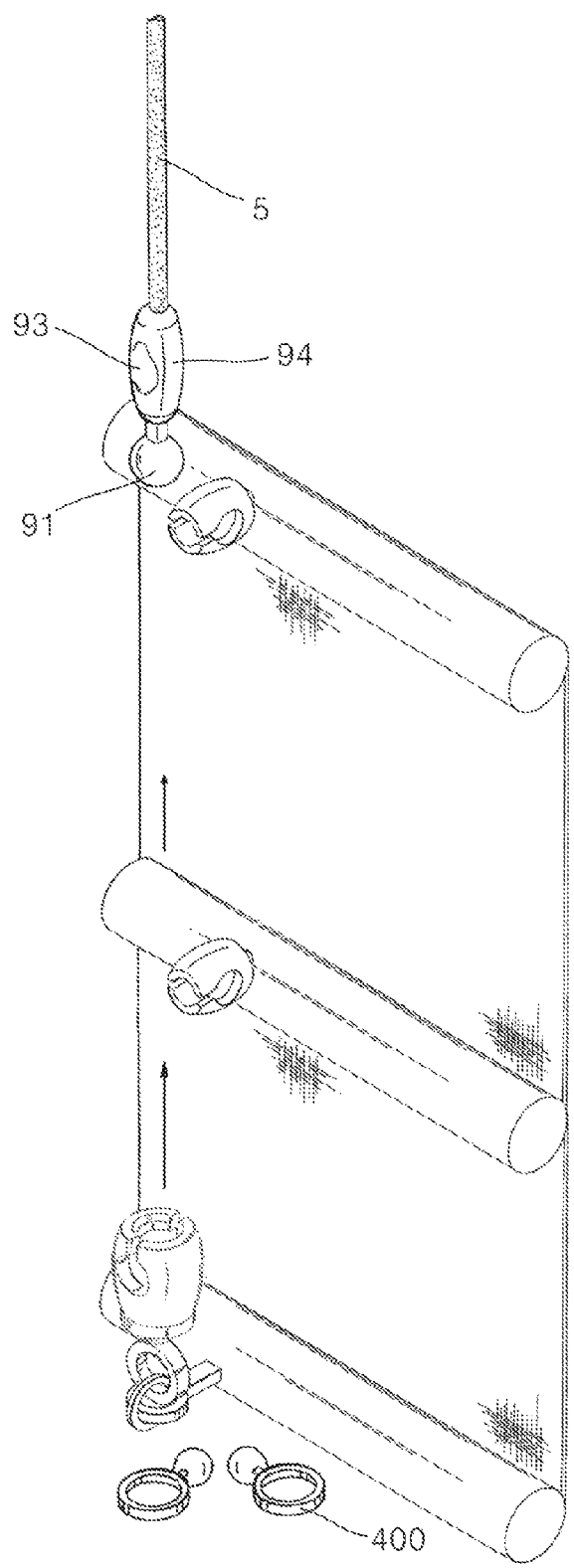
FIG. 18 is a view showing that the ball latch body is extracted out of the connection barrel.

In case a kid is tangled with the pull cord 5, the weight or pulling force of the kid will extract the ball latch body 91 out of the connection barrel 2 (as shown in FIG. 17) and separate the movable fixing rings 400 from the pull cord 5. Under such circumstance, the pull cord 5 is not fixed so that the tangle of the pull cord 5 with the kid can be avoided (as shown in FIG. 18).

Figure 19:
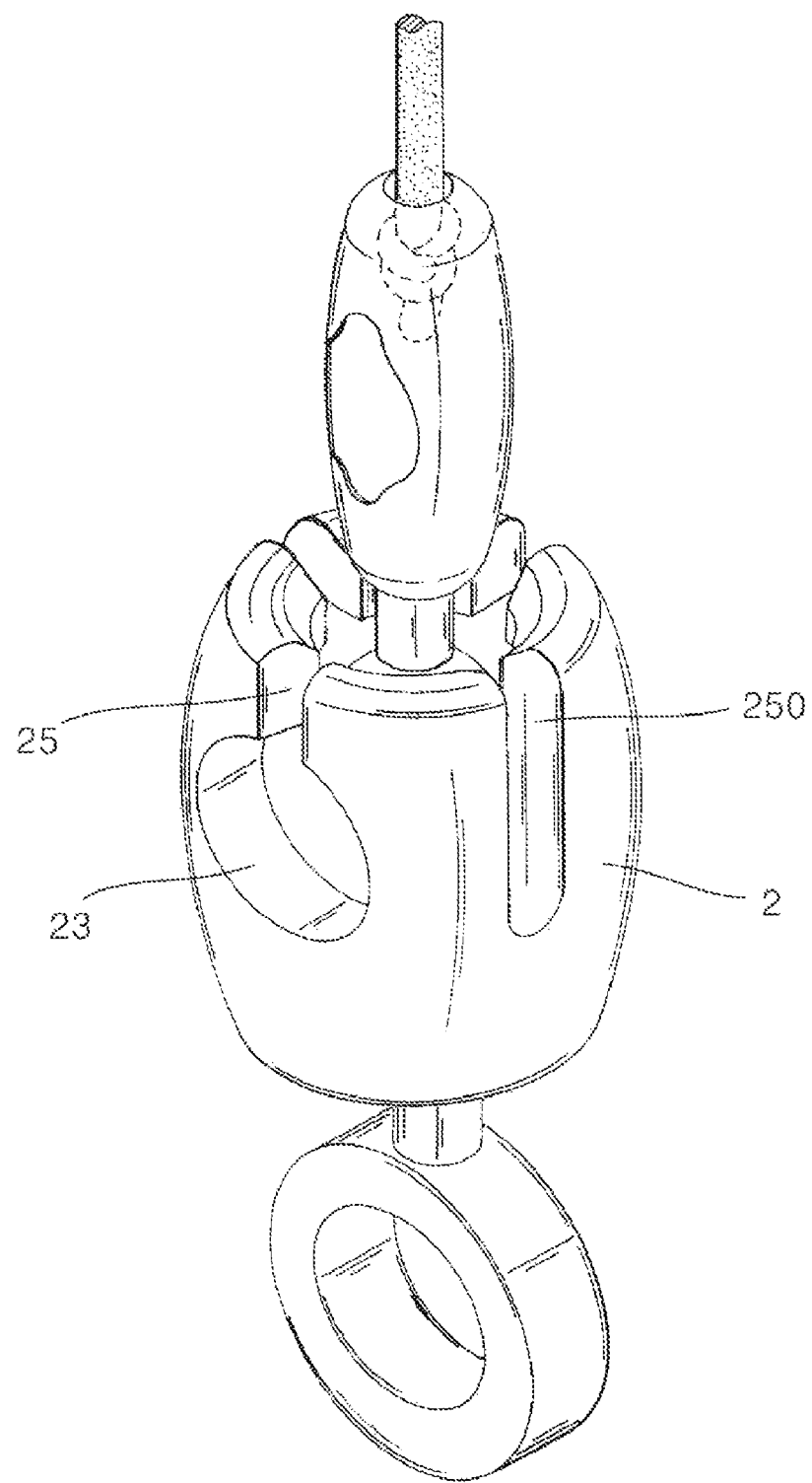
FIG. 19 is a perspective view of still another embodiment of the connection barrel of the present invention.
Figure 20:
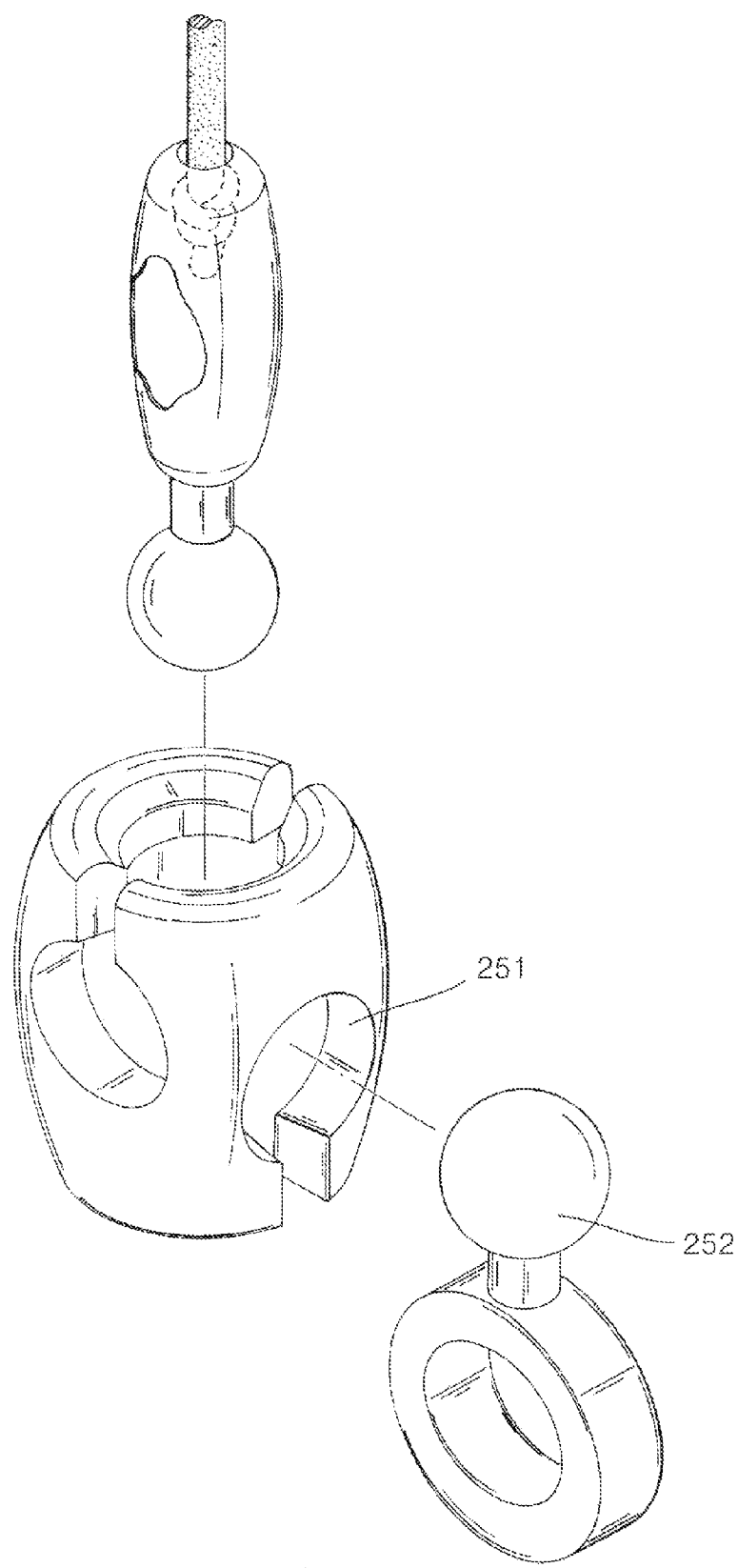
FIG. 20 is a perspective view of still another embodiment of the connection barrel of the present invention.

FIG. 19 shows another embodiment of the present invention, in which the upper end of the connection barrel 2 is additionally formed with two elongated splits 250, whereby the latch body 1 can be more easily extracted out of the connection barrel 2. FIG. 20 shows that another escape hole 251 is formed at the lower end of the connection barrel 2. The ball body 252 can be detachably plugged into the connection barrel 2 through the escape hole 251.

Figure 21:
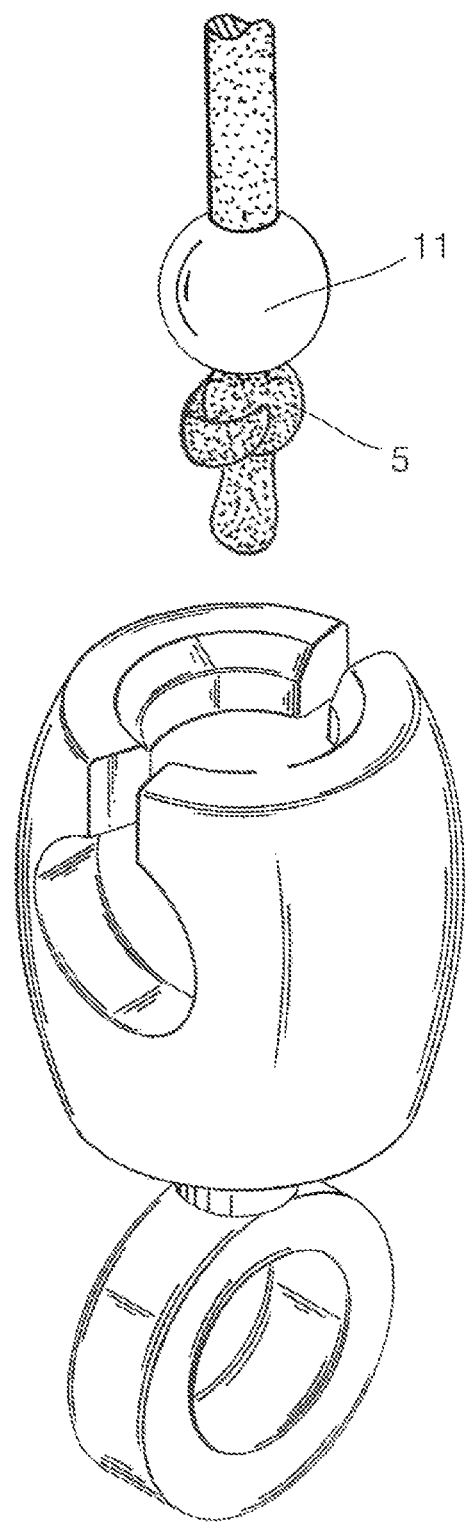
FIG. 21 shows that the pull cord is passed through the ball latch body and knotted to fix with the ball latch body.
Figure 22:
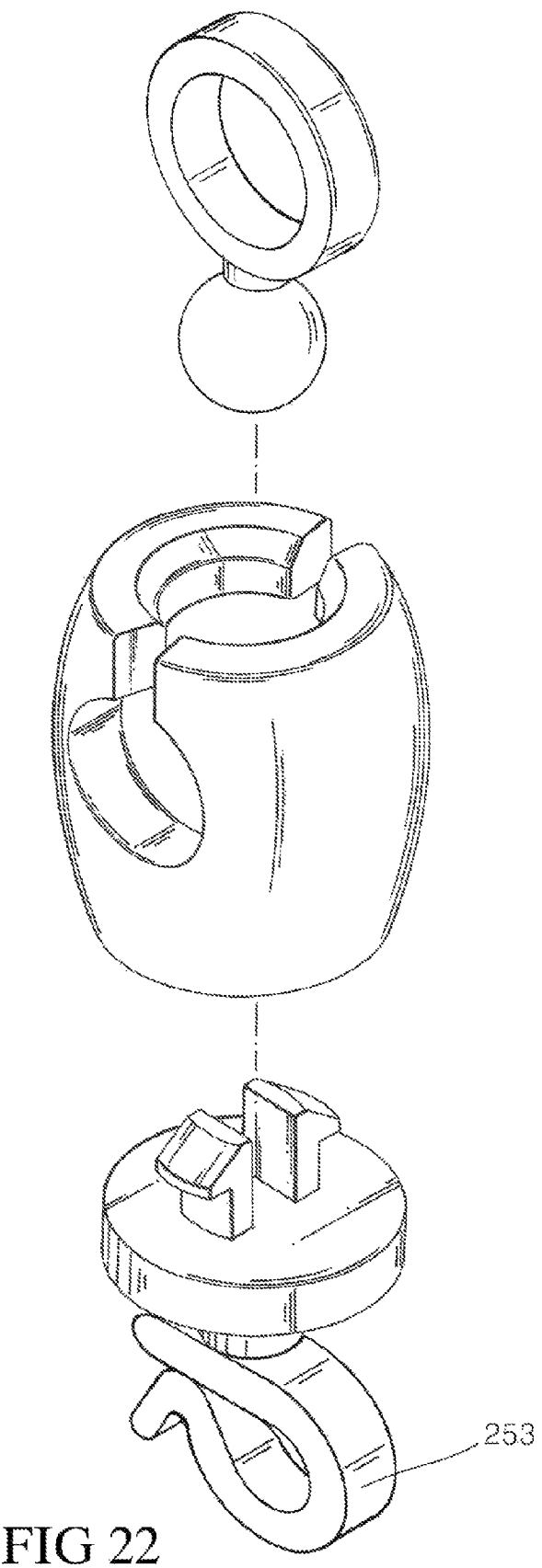
FIG. 22 is a perspective view of another embodiment of the double latch ring seat of the present invention.

FIGS. 21 and 22 respectively show the fixing method for the ball latch body 11 and the latching method for the double latch ring seat 3. In FIG. 21, the pull cord 5 is passed through the ball latch body 11 and knotted to fix with the ball latch body 11. The ring section at the lower end of the latch ring seat 3 is replaced with a hook section 253 for directly hooking.

The above embodiments are only used to illustrate the present invention, not intended to limit the scope thereof. Many modifications of the above embodiments can be made without departing from the spirit of the present invention.

What is claimed is:

1. A safety release device for Roman blind pull cord, the safety release device being disposed between the pull cord of the Roman blind and a lower suspension of the Roman blind, the safety release device comprising:
  a latch body having a cord retainer body and a ball latch body downward extending from a lower side of the cord retainer body, the cord retainer body being a hollow body, an upper end of the cord retainer body being formed with a perforation for the pull cord to extend through the perforation and connect with the cord retainer body, whereby the pull cord is hidden in the cord retainer body;
  a connection barrel, which is a hollow body having an interior spherical socket, an upper end of the connection barrel being formed with a circular through hole in communication with the spherical socket, two opposite sides of the connection barrel being respectively formed with at least two elliptic escape holes in communication with the spherical socket, a split being formed on an upper side of each elliptic escape hole, the split extending from the elliptic escape hole to the upper end face of the connection barrel, whereby the ball latch body of the latch body can be correspondingly plugged into the spherical socket of the connection barrel or extracted out of the spherical socket; and
  a double latch ring seat, which can be latched with the connection barrel and connected with the lower suspension of the Roman blind, the double latch ring seat including a disc-shaped main body, a pair of latch arms disposed on the disc-shaped main body in parallel to each other, and a latch ring body downward extending from a lower end of the disc-shaped main body, the latch ring body being connected with the lower suspension of the Roman blind via a movable ring.

2. The safety release device for Roman blind pull cord as claimed in claim 1, wherein the perforation of the upper end of the latch body is inward tapered in the form of a funnel.

3. The safety release device for Roman blind pull cord as claimed in claim 2, wherein two sides of the cord retainer body are respectively formed with two transverse through holes in communication with the perforation of the cord retainer body.

4. The safety release device for Roman blind pull cord as claimed in claim 3, wherein two sides of the two through holes are formed with beveled faces, whereby when the latch body is rotated, the beveled faces reduce resistance and enhance smoothness.

5. The safety release device for Roman blind pull cord as claimed in claim 1, wherein the ball latch body is connected with the cord retainer body via a longitudinally extending connection stem and is spaced from the cord retainer body by a certain distance.

6. The safety release device for Roman blind pull cord as claimed in claim 5, wherein the length and size of the connection stem are larger than the length of the split formed on the upper side of the elliptic escape hole of the connection barrel.

7. The safety release device for Roman blind pull cord as claimed in claim 1, wherein the split formed on the upper side of the elliptic escape hole of the connection barrel is inward tapered.

8. The safety release device for Roman blind pull cord as claimed in claim 1, wherein the escape holes formed on two sides of the connection barrel are circular holes.

9. The safety release device for Roman blind pull cord as claimed in claim 1, wherein the latch ring body downward extending from the lower end of the main body of the double latch ring seat is connected with the main body via a longitudinally extending connection stem and is spaced from the main body by a certain distance.

10. The safety release device for Roman blind pull cord as claimed in claim 1, wherein the circular through hole formed on the upper end of the connection barrel in communication with the spherical socket is inward tapered in the form of a funnel.

11. The safety release device for Roman blind pull cord as claimed in claim 1, wherein the upper annular end face of the connection barrel is formed with an arcuate face.

12. The safety release device for Roman blind pull cord as claimed in claim 1, wherein the upper annular end face of the connection barrel is formed with an angle structure with two beveled faces.

13. The safety release device for Roman blind pull cord as claimed in claim 1, wherein the ring section integrally extends from the lower end of the connection barrel.

14. The safety release device for Roman blind pull cord as claimed in claim 13, wherein the ring section integrally extending from the lower end of the connection barrel is directed in a direction reverse to that of the elliptic escape holes formed on two sides of the connection barrel.

15. The safety release device for Roman blind pull cord as claimed in claim 1, wherein the disc-shaped main body of the double latch ring seat has a size equal to that of the bottom of the connection barrel.

16. The safety release device for Roman blind pull cord as claimed in claim 1, wherein the two latch arms are oppositely arranged on the disc-shaped main body of the double latch ring seat, each latch arm having a hook section at its free end, whereby when the latch arms are plugged into the connection barrel, the hook sections are latched with the bottom of the connection barrel.

17. The safety release device for Roman blind pull cord as claimed in claim 1, wherein the spherical socket has a configuration identical to that of the ball latch body.

* * * * *